United States Patent
Yoon et al.

(10) Patent No.: US 11,130,314 B2
(45) Date of Patent: *Sep. 28, 2021

(54) METHOD OF MANUFACTURING CURVED LAMINATED GLASS AND CURVED LAMINATED GLASS

(71) Applicant: LG CHEM, LTD., Seoul (KR)

(72) Inventors: Jae Hyuk Yoon, Daejeon (KR); Jun Hak Oh, Daejeon (KR); Ho Seong Kang, Daejeon (KR); Chang Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/348,360

(22) PCT Filed: Dec. 21, 2017

(86) PCT No.: PCT/KR2017/015254
§ 371 (c)(1),
(2) Date: May 8, 2019

(87) PCT Pub. No.: WO2018/117692
PCT Pub. Date: Jun. 28, 2018

(65) Prior Publication Data
US 2020/0055281 A1    Feb. 20, 2020

(30) Foreign Application Priority Data
Dec. 21, 2016  (KR) .................. 10-2016-0175990

(51) Int. Cl.
*B32B 17/10* (2006.01)
*B60J 1/00* (2006.01)
*B60J 1/08* (2006.01)

(52) U.S. Cl.
CPC .. *B32B 17/10036* (2013.01); *B32B 17/10119* (2013.01); *B32B 17/10385* (2013.01);
(Continued)

(58) Field of Classification Search
CPC .................. B60J 1/00; B60J 1/001; B32B 17/10036–10128; B32B 17/10807–1099; C03C 21/00–002; Y10T 428/315
See application file for complete search history.

(56) References Cited

U.S. PATENT DOCUMENTS 5,110,637 A    5/1992  Ando et al.
5,928,793 A *  7/1999  Kimura .................. C03C 21/002
                                                      428/428

(Continued)

FOREIGN PATENT DOCUMENTS

CN    103501998 A   1/2014
EP     2619003 B1   9/2014
(Continued)

OTHER PUBLICATIONS

Machine translation of JP 2015/205784 A, obtained from J-Platpat service of the JPO (Year: 2020).*

*Primary Examiner* — Z. Jim Yang
(74) *Attorney, Agent, or Firm* — Dentons US LLP

(57) ABSTRACT

The present disclosure relates to a method of manufacturing a curved laminated glass and the curved laminated glass. The method comprises preparing a curved soda lime glass, providing a functional layer on one surface of an alkali-free glass, disposing a lamination film or a bonding agent between the curved soda lime glass and the functional layer, and elastically deforming the alkali-free glass, and laminating the alkali-free glass with the curved soda lime glass.

8 Claims, 6 Drawing Sheets

(52) U.S. Cl.
CPC ........ *B32B 17/10467* (2013.01); *B60J 1/001* (2013.01); *B32B 17/10165* (2013.01); *B32B 17/10761* (2013.01); *B32B 17/10889* (2013.01); *B32B 2367/00* (2013.01); *B60J 1/08* (2013.01)

(56) References Cited

U.S. PATENT DOCUMENTS

| | | | |
|---|---|---|---|
| 6,268,304 B1* | 7/2001 | Maeda | C03C 3/091 |
| | | | 501/63 |
| 9,375,900 B2 | 6/2016 | Tsuchiya et al. | |
| 2006/0250559 A1 | 11/2006 | Bocko et al. | |
| 2008/0110208 A1* | 5/2008 | Ellison | C03C 3/091 |
| | | | 65/90 |
| 2008/0292856 A1* | 11/2008 | Garner | H01L 51/0097 |
| | | | 428/220 |
| 2012/0280368 A1 | 12/2012 | Garner et al. | |
| 2013/0114219 A1 | 5/2013 | Garner et al. | |
| 2013/0242562 A1 | 9/2013 | Labrot | |
| 2014/0014260 A1* | 1/2014 | Chowdhury | B32B 17/061 |
| | | | 156/222 |
| 2014/0141206 A1* | 5/2014 | Gillard | B32B 17/10036 |
| | | | 428/174 |
| 2014/0171286 A1* | 6/2014 | Lee | C03C 3/091 |
| | | | 501/66 |
| 2014/0235425 A1* | 8/2014 | Nishizawa | C03C 3/087 |
| | | | 501/67 |
| 2015/0329408 A1* | 11/2015 | Bookbinder | C03C 3/045 |
| | | | 428/410 |
| 2016/0136929 A1* | 5/2016 | Meiss | B32B 17/10018 |
| | | | 428/213 |
| 2017/0008377 A1* | 1/2017 | Fisher | B32B 17/10036 |
| 2017/0057205 A1* | 3/2017 | Notsu | B32B 17/10036 |
| 2017/0096364 A1* | 4/2017 | Ottermann | C03C 3/085 |
| 2017/0113520 A1 | 4/2017 | Sienerth et al. | |
| 2017/0329192 A1* | 11/2017 | Ono | G02F 1/136286 |
| 2018/0141850 A1* | 5/2018 | Dejneka | C03C 3/085 |
| 2018/0215125 A1* | 8/2018 | Gahagan | G02F 1/136286 |

FOREIGN PATENT DOCUMENTS

| | | | | |
|---|---|---|---|---|
| JP | 2013-188993 A | | 9/2013 | |
| JP | 2014-129189 A | | 7/2014 | |
| JP | 2015-506888 A | | 3/2015 | |
| JP | 2015205784 A | * | 11/2015 | ....... B32B 17/10036 |
| JP | 2016-52990 A | | 4/2016 | |
| KR | 1996-0004373 B1 | | 4/1996 | |
| KR | 10-2006-0041206 A | | 5/2006 | |
| KR | 10-2007-0009991 A | | 1/2007 | |
| KR | 10-2014-0012702 A | | 2/2014 | |
| KR | 10-2014-0088906 A | | 7/2014 | |
| KR | 10-1520396 B1 | | 5/2015 | |
| KR | 10-2016-0121345 A | | 10/2016 | |
| KR | 10-2016-0135280 A | | 11/2016 | |
| WO | 2013/107706 A1 | | 7/2013 | |
| WO | 2013-094567 A1 | | 4/2015 | |
| WO | WO-2016196531 A1 | * | 12/2016 | ....... B32B 17/10036 |

* cited by examiner

[Figure 1]
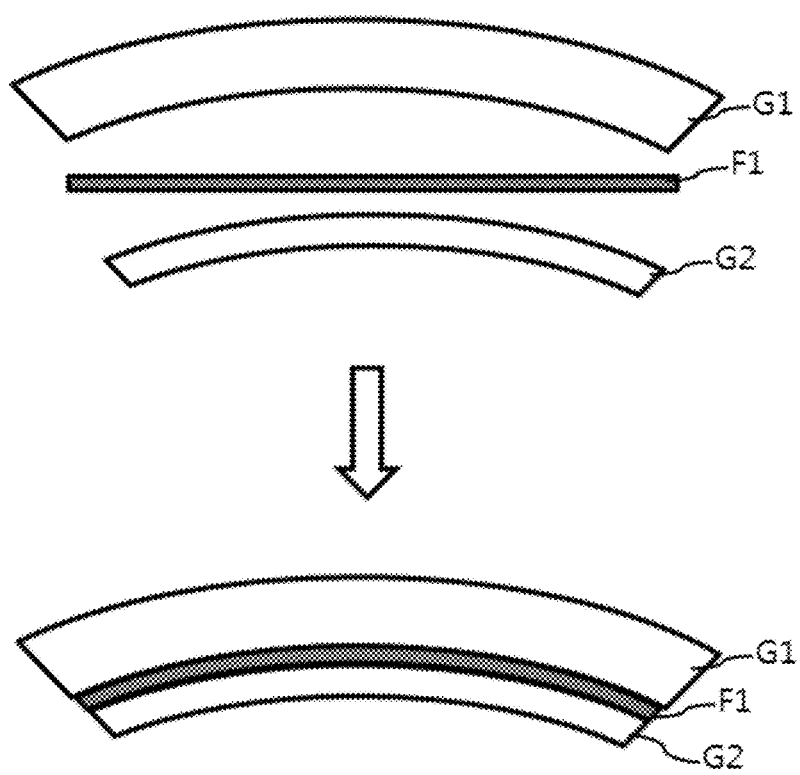

[Figure 2]
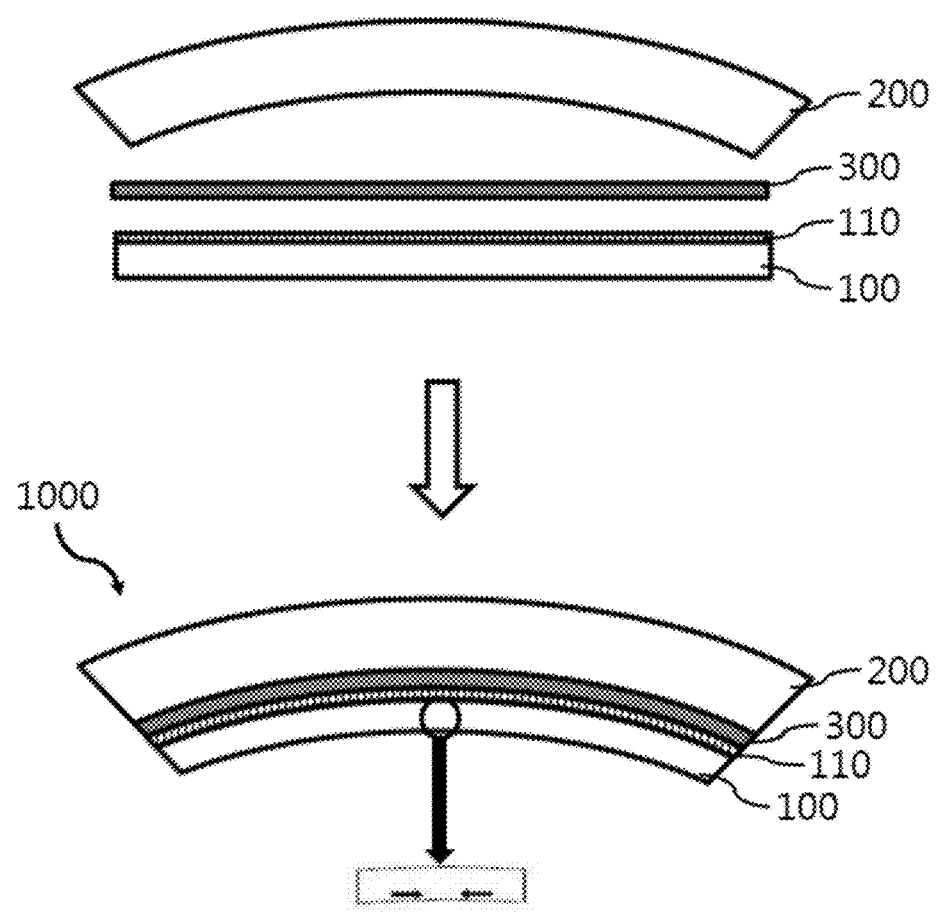

[Figure 3]
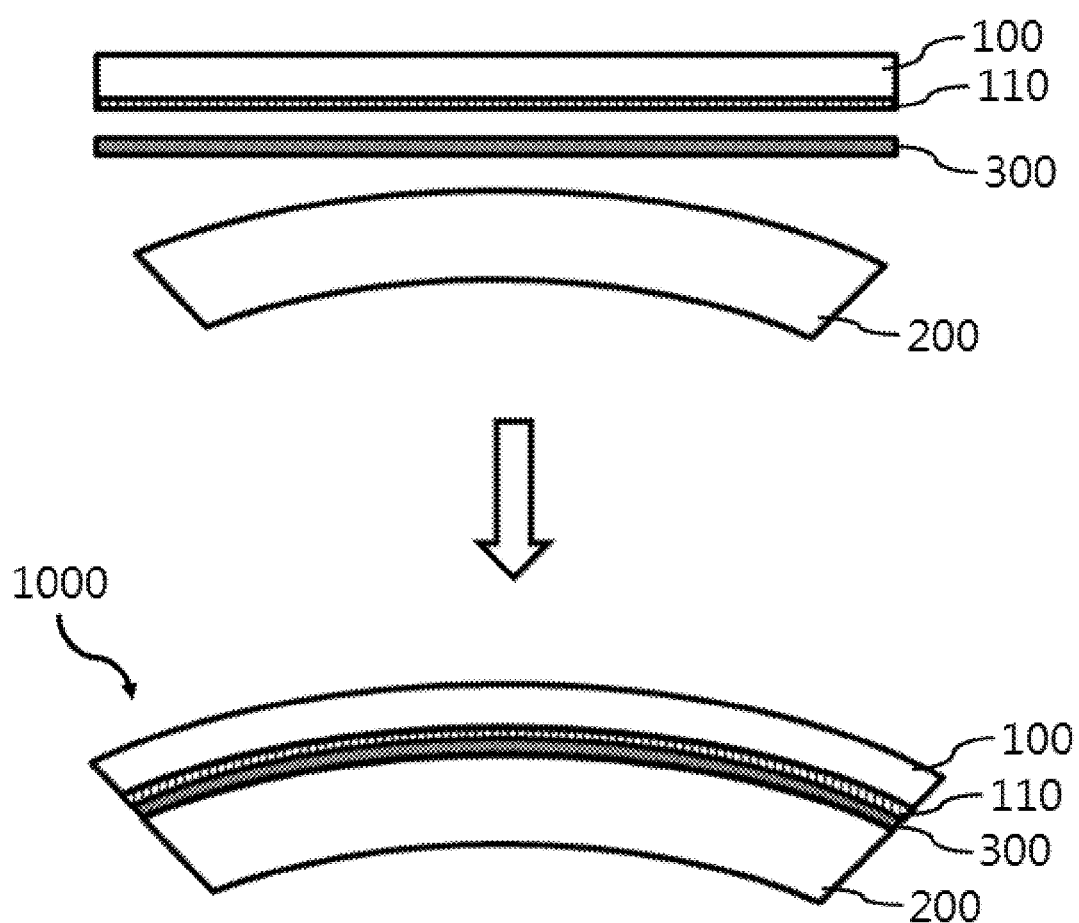

[Figure 4]
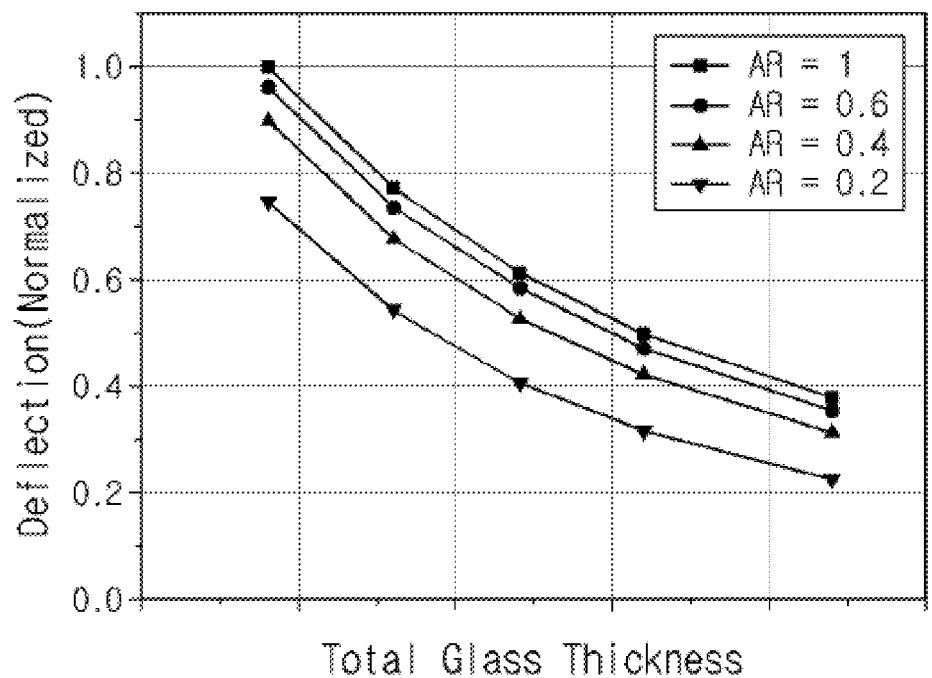

[Figure 5]
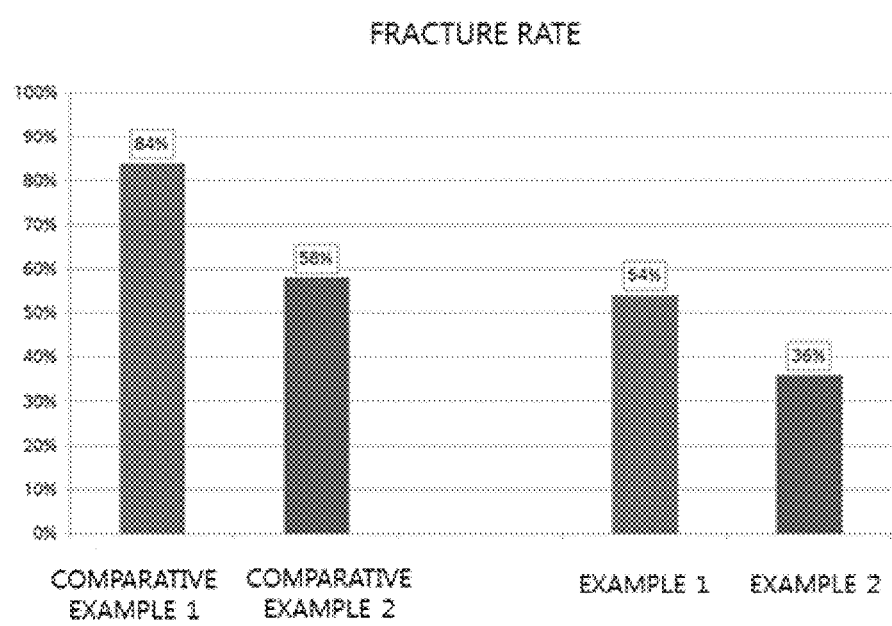

[Figure 6]
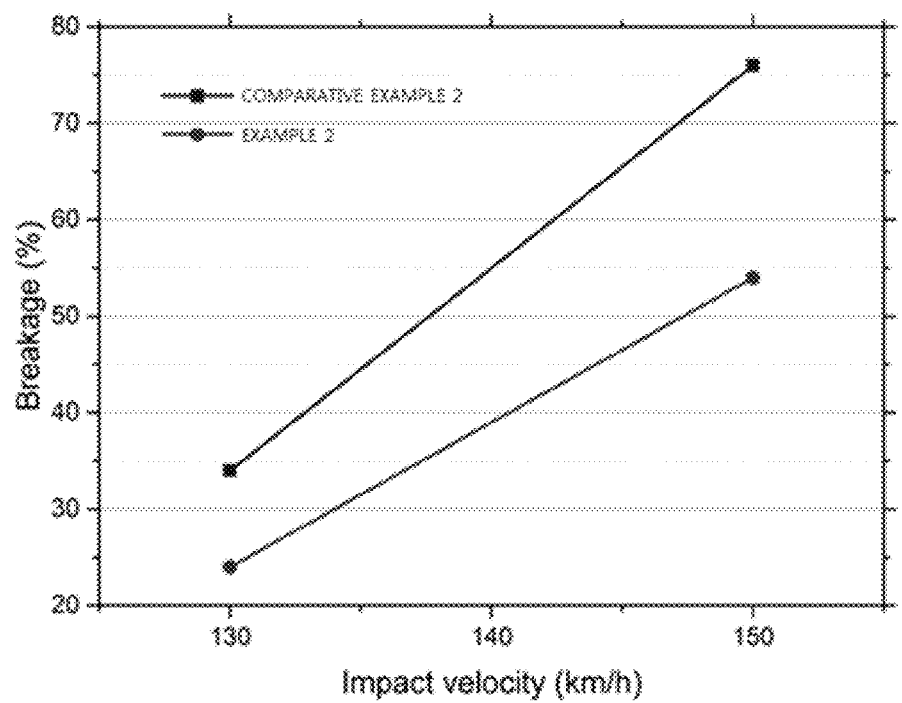

METHOD OF MANUFACTURING CURVED LAMINATED GLASS AND CURVED LAMINATED GLASS

The present application is a National Phase entry of PCT/KR2017/015254 filed on Dec. 21, 2017, and claims priority to and the benefit of Korean Patent Application No. 10-2016-0175990 filed in the Korean Intellectual Property Office on Dec. 21, 2016, the entire contents of which are incorporated herein by reference on their entirety.

TECHNICAL FIELD

The present disclosure relates to a method of manufacturing a curved laminated glass and curved laminated glass.

BACKGROUND ART

For use as a window of an automobile, a curved laminated glass in a form in which two sheets of curved molded glass are laminated by a lamination film has been widely distributed. Recently, in order to reduce the weight of an automobile, manufacturing of a thin curved laminated glass by using a thicker glass at the outer side of the automobile than a glass at the inner side thereof has been studied.

The curved laminated glass has been generally manufactured by molding two sheets of glass used for lamination so as to have a curved surface having a target shape, and then subjecting the two sheets of molded glass to a lamination process. An example of a method of manufacturing an automotive laminated glass is illustrated in FIG. 1. Referring to FIG. 1, a curved molded thick glass G1 and a curved molded thin glass G2 are prepared, and the two sheets of glass G1 and G2 are laminated by using a lamination film F1. As a method of molding the two sheets of glass G1 and G2, the two sheets of glass G1 and G2 are molded through a self-weight method by inserting a release agent between the two sheets of glass G1 and G2, and then exposing the two sheets of glass to a high temperature in a state where the two sheets of glass are placed on a molding frame, or a press method is used, in which glass is inserted between an upper mold and a lower mold, and then pressure is applied thereto at high temperature.

However, when the curved laminated glass is manufactured by molding two sheets of glass, which have different thicknesses, as described above, the two sheets of glass have different bendabilities and thus are not easily molded into a target shape. Further, when the molding temperatures of the two sheets of glass are different, there may occur a problem in that the two sheets of glass are not molded into a target shape. In addition, when a release agent is inserted between the two sheets of glass, and then the two sheets of glass are molded, there is a concern in that scratches may be generated on the surface of glass by the release agent interposed between the two sheets of glass. Furthermore, since a molding process needs to be performed twice in order to produce one sheet of laminated glass during a molding process using a mold, production costs of the curved laminated glass are increased.

Recently, there has been a trend towards a demand for automotive glass to which functionality is added. However, in order to add functionality to laminated glass which may be used as automotive glass, a transparent heat generating layer, a transparent display, or the like is not easily formed on curved molded glass. This is because a process of inserting a thin functional layer into curved molded glass is not easily performed.

Therefore, there is a need for a technology capable of easily manufacturing curved laminated glass to which functionality is added.

DETAILED DESCRIPTION OF THE INVENTION

Technical Problem

The present disclosure relates to a method of manufacturing curved laminated glass and curved laminated glass.

However, a technical problem to be solved by the present invention is not limited to the aforementioned problem, and the other problems that are not mentioned may be clearly understood by the person skilled in the art from the following description.

Technical Solution

An exemplary embodiment of the present invention provide a method of manufacturing curved laminated glass, the method including: preparing curved soda lime glass; providing a functional layer on one surface of plate-like alkali-free glass; disposing a lamination film or a bonding agent between the curved soda lime glass and the functional layer; and manufacturing curved laminated glass by elastically deforming the alkali-free glass to laminate the alkali-free glass so as to be fit with the curved soda lime glass.

Further, another exemplary embodiment of the present invention provides curved laminated glass.

The exemplary embodiment of the present invention provides curved laminated glass including: alkali-free glass provided with a functional layer on one surface thereof; and soda lime glass laminated to the one surface of the alkali-free glass provided with a functional layer by a lamination film or a bonding agent, in which the alkali-free glass and the soda lime glass are bent while forming a curved surface in a state of being fit with each other.

Advantageous Effects

According to an exemplary embodiment of the present invention, it is possible to simplify a process of manufacturing curved laminated glass.

According to an exemplary embodiment of the present invention, it is possible to decrease manufacturing costs and a manufacturing time of curved laminated glass.

The curved laminated glass according to an exemplary embodiment of the present invention may have excellent durability.

According to an exemplary embodiment of the present invention, it is possible to provide curved laminated glass which is lightweight and thin.

The effect of the present invention is not limited to the above-described effect, and effects, which are not mentioned, will be clearly understood by a person skilled in the art from the specification of the present application and the accompanying drawings.

BRIEF DESCRIPTION OF DRAWINGS

FIG. 1 is a view illustrating a process of manufacturing curved laminated glass according to a method in the related art.

FIG. 2 is a view illustrating a process of laminating alkali-free glass provided with a functional layer to one concave surface of curved soda lime glass according to an exemplary embodiment of the present invention.

FIG. 3 is a view illustrating a process of laminating alkali-free glass provided with a functional layer to the other convex surface of curved soda lime glass according to an exemplary embodiment of the present invention.

FIG. 4 is a view illustrating a result of securing stiffness according to a thickness ratio of soda lime glass to alkali-free glass according to an exemplary embodiment of the present invention.

FIG. 5 is a view illustrating a falling ball impact test result of curved laminated glass manufactured in Example 1, Example 2, Comparative Example 1, and Comparative Example 2.

FIG. 6 is a view illustrating a high-speed moving object impact test result of curved laminated glass manufactured in Example 2 and Comparative Example 2.

MODE FOR INVENTION

When one part "includes" one constituent element throughout the specification of the present application, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

Throughout the specification of the present application, the unit "wt %" may mean a weight ratio of a component included in a member based on the total weight of the member.

Throughout the specification of the present application, "radius of curvature" may mean a minimum value of a radius of an arc which is closest to a curved surface in all the directions from one point on the surface of a member molded into the curved surface, and the radius of curvature may be measured by scanning and modeling a surface of a member molded into a curved surface using a 3D scanner (Faro/Focus S), and the like.

Hereinafter, the present specification will be described in more detail.

An exemplary embodiment of the present invention provide a method of manufacturing curved laminated glass, the method including: preparing curved soda lime glass; providing a functional layer on one surface of plate-like alkali-free glass; disposing a lamination film or a bonding agent between the curved soda lime glass and the functional layer; and manufacturing curved laminated glass by elastically deforming the alkali-free glass to laminate the alkali-free glass so as to be fit with the curved soda lime glass.

According to an exemplary embodiment of the present invention, a process of manufacturing curved laminated glass may be simplified. Specifically, by the method of manufacturing curved laminated glass, alkali-free glass may be elastically deformed to be molded into a curved surface. That is, a process of manufacturing curved laminated glass may be simplified by omitting a process of separately adding heat and a process of slowly cooling alkali-free glass in order to mold the alkali-free glass into a curved surface. Further, manufacturing costs and a manufacturing time of curved laminated glass may be decreased by omitting the processes.

FIG. 2 is a view illustrating a process of laminating alkali-free glass provided with a functional layer to one concave surface of curved soda lime glass according to an exemplary embodiment of the present invention. Specifically, FIG. 2 is a view illustrating a process of manufacturing curved laminated glass 1000 by disposing a lamination film 300 between a functional layer 110 provided on one surface of plate-like alkali-free glass 100 and one concave surface of curved soda lime glass 200, and then elastically deforming the alkali-free glass 100.

FIG. 3 is a view illustrating a process of laminating alkali-free glass provided with a functional layer to the other convex surface of curved soda lime glass according to an exemplary embodiment of the present invention. Specifically, FIG. 3 is a view illustrating a process of manufacturing the curved laminated glass 1000 by disposing the lamination film 300 between the functional layer 110 provided on one surface of the plate-like alkali-free glass 100 and the other convex surface of the curved soda lime glass 200, and then elastically deforming the alkali-free glass 100.

According to an exemplary embodiment of the present invention, the preparing of the curved soda lime glass may be molding plate-like soda lime glass into a curved surface by using a method of molding glass into a curved surface, which is publicly-known in the art. As an example, curved soda lime glass may be manufactured by using a self-weight molding method or a compression molding method. Specifically, curved soda lime glass may be manufactured from plate-like soda lime glass by using a self-weight molding method at a temperature of 500° C. to 700° C.

According to an exemplary embodiment of the present invention, a lamination film or a bonding agent may be disposed between the curved soda lime glass and the functional layer. Specifically, a lamination film or a bonding agent may be provided on the functional layer provided on one surface of the alkali-free glass. Further, the lamination film or the bonding agent may be provided on one concave surface or the other convex surface of the curved soda lime glass. Through the lamination film or the bonding agent, the curved alkali-free glass, which is elastically deformed and thus molded into a curved surface, and the curved soda lime glass may be laminated to each other.

According to an exemplary embodiment of the present invention, the lamination film may be single-layered or multilayered. When a multi-layered lamination film having two or more layers is used, the compositions of the layers may be different from each other, and the thicknesses of the layers may be the same as or different from each other. As the lamination film, a film for laminating glass in the art may be used without limitation. As an example, the lamination film may include at least one of polyethylene, an ethylene acetic acid vinyl copolymer, polypropylene, polystyrene, a methacrylic resin, polyvinyl chloride, polyethylene terephthalate, polybutylene terephthalate, cellulose acetate, a diallyl phthalate resin, a urea resin, a melamine resin, unsaturated polyester, polyvinylbutyral, polyvinyl formal, polyvinyl alcohol, an acetic acid vinyl resin, an ionomer, polymethylpentene, vinylidene chloride, polysulfone, polyvinylidene fluoride, a methacryl-styrene copolymer resin, polyarylate, polyallyl sulfone, polybutadiene, polyether sulfone, and polyether ether ketone.

Further, as the lamination film, it is possible to use a lamination film which has a bonding strength capable of fixing the curved soda lime glass and the curved alkali-free glass with a desired strength, excellent transmission performance with respect to visible light, and excellent chemical durability. In addition, the lamination film may be a lamination film to which functionality is added. As an example, the lamination film may be a lamination film to which functionality such as a sound insulation adjusting performance, a light refractive index adjusting performance, a double-phase reduction performance, and a UV transmission adjusting performance is added.

According to an exemplary embodiment of the present invention, the lamination film may have a thickness of 0.5 mm to 1 mm. By adjusting the thickness of the lamination film to the above-described range, impact absorbability of the lamination film may be suppressed from deteriorating. Further, a lamination film having a thickness within the above-described range may stably fix the curved alkali-free glass and the curved soda lime glass, thereby preventing the curved alkali-free glass and the curved soda lime glass from being peeled off from the lamination film. In addition, it is possible to prevent stiffness of the curved laminated glass from deteriorating.

According to an exemplary embodiment of the present invention, examples of the bonding agent may include an optically clear adhesive (OCA), a liquid optically clear adhesive (LOCA), or an optically clear resin (OCR). The bonding agent may be applied to have a thickness of 0.5 mm to 1.5 mm onto the functional layer or the curved soda lime glass.

According to an exemplary embodiment of the present invention, the plate-like alkali-free glass may be elastically deformed to be laminated to one concave surface or the other convex surface of the curved soda lime glass so as to be fit with each other. That is, the curved alkali-free glass may be laminated to one concave surface or the other convex surface of the curved soda lime glass while being fit with each other. In the present specification, being laminated while being fit with each other may mean that the radius of curvature of the curved soda lime glass and the radius of curvature of the curved alkali-free glass are the same as each other, and the curved soda lime glass and the alkali-free glass are laminated to each other while forming an edge together at the same position.

By laminating the curved alkali-free glass and the curved soda lime glass so as to be fit with each other, a lifting between the two sheets of glass may be suppressed in curved laminated glass to be manufactured, and the transmission performance of the curved laminated glass may be improved.

According to an exemplary embodiment of the present invention, the curved soda lime glass and the elastically deformed alkali-free glass may have the same radius of curvature. The same radius of curvature may mean not only a case where the radii of curvature are completely the same as each other, but also a case where a slight difference occurs in radius of curvature during the manufacturing process, but the slight difference does not affect the quality, physical properties, and the like.

The curved soda lime glass and the curved alkali-free glass have the same radius of curvature, so that the two sheets of glass may be more precisely laminated to each other. With the configuration, transmission performance of curved laminated glass to be manufactured may be improved. When the curved laminated glass is used for the front glass of an automobile, there is an advantage in that a user may more clearly secure a visual field.

According to an exemplary embodiment of the present invention, the curved soda lime glass and the curved alkali-free glass may have a radius of curvature of 3,000 R to 10,000 R. Specifically, the curved soda lime glass and the curved alkali-free glass may have a radius of curvature of 4,000 R to 8,000 R or 5,000 R to 7,000 R. However, the radii of curvature of the curved soda lime glass and the curved alkali-free glass as described above may be adjusted according to the use of the curved laminated glass.

According to an exemplary embodiment of the present invention, the alkali-free glass may be elastically deformed at a temperature of 50° C. or less. Specifically, the alkali-free glass may be elastically deformed at a temperature of 0° C. to 15° C., a temperature of 20° C. to 35° C., or a temperature of 25° C. to 45° C.

That is, the method of manufacturing curved laminated glass may mold alkali-free glass into a curved surface without adding heat to the alkali-free glass, thereby reducing manufacturing costs of the curved laminated glass. Further, a manufacturing time of curved laminated glass may be shortened by omitting a process of slowly cooling glass.

The method of elastically deforming the plate-like alkali-free glass is not particularly limited as long as the method is typically used in the art. As an example, the plate-like alkali-free glass may be elastically deformed at a temperature of 20° C. to 35° C. through a compression process using a high temperature roller or vacuum ring/vacuum bag process.

According to an exemplary embodiment of the present invention, the method may further include subjecting the curved laminated glass to a heat treatment at a temperature of 80° C. to 140° C. The lamination strength between the curved alkali-free glass and the curved thin-plate glass may be improved by subjecting the curved laminated glass manufactured to a heat treatment within the above-described temperature range.

According to an exemplary embodiment of the present invention, the alkali-free glass provided with the functional layer may be elastically deformed to be laminated to one concave surface or the other convex surface of the curved soda lime glass.

Referring to FIG. 2, the curved laminated glass 1000 may be manufactured by elastically deforming the alkali-free glass 100 provided with the functional layer 110 to be laminated to one concave surface of the curved soda lime glass 200. As the alkali-free glass is elastically deformed on the one concave surface of the curved soda lime glass, compression stress may be formed on a surface opposite to the surface of the curved alkali-free glass adjacent to the curved soda lime glass. Referring to FIG. 2, compression stress may be formed on a concave surface of the elastically deformed curved alkali-free glass 100 inwardly from the end of the curved alkali-free glass 100. The curved laminated glass including the curved alkali-free glass with the compression stress formed on the concave surface may have excellent durability.

According to an exemplary embodiment of the present invention, when the plate-like alkali-free glass is elastically deformed and thus is laminated to one concave surface of the curved soda lime glass, the plate-like alkali-free glass may have a dimension smaller than that of the plate-like soda lime glass. With the configuration, the curved alkali-free glass and the curved soda lime glass may form an edge together at the same position.

Referring to FIG. 3, the curved laminated glass 1000 may be manufactured by elastically deforming the alkali-free glass 100 provided with the functional layer 110 to be laminated to the other convex surface of the curved soda lime glass 200. The curved laminated glass may be used as glass for an automobile.

The curved alkali-free glass may have excellent scratch resistance and high glass surface hardness. That is, it is possible to effectively reduce damage due to impact of foreign substances such as sand flying from the outside of an automobile by disposing the curved alkali-free glass at the outer side of the automobile. Further, as described below, the curved alkali-free glass has a high fracture toughness value, and thus may provide curved laminated glass for an automobile, which is excellent in fracture resistance to external impact.

According to an exemplary embodiment of the present invention, when the plate-like alkali-free glass is elastically deformed and thus laminated onto the other convex surface of the curved soda lime glass, the plate-like alkali-free glass may have a dimension larger than that of the plate-like soda lime glass. With the configuration, the curved alkali-free glass and the curved soda lime glass may form an edge together at the same position.

According to an exemplary embodiment of the present invention, a thickness ratio of the soda lime glass to the alkali-free glass may be 1:0.2 to 1:0.6. Specifically, a thickness ratio of the soda lime glass to the alkali-free glass may be 1:0.25 to 1:0.55, 1:0.3 to 1:0.4, 1:0.2 to 1:0.3, or 1:0.35 to 1:0.55. By adjusting the thickness ratio of the soda lime glass to the alkali-free glass within the above-described range, it is possible to effectively suppress fractures of the curved laminated glass due to a drop in stiffness. Furthermore, it is possible to effectively achieve a reduction in weight and thinning of the curved laminated glass.

FIG. 4 is a view illustrating a result of securing stiffness according to a thickness ratio of soda lime glass to alkali-free glass according to an exemplary embodiment of the present invention. Specifically, FIG. 4 is a view illustrating that an amount of drooping at the center of curved laminated glass is analyzed by applying a predetermined load to the center of the curved laminated glass in a state where four corners of the curved laminated glass according to an exemplary embodiment of the present invention are fixed. In FIG. 4, the x-axis indicates the total thickness of glass, and the y-axis indicates the amount of drooping of glass, that is, a degree to which glass is bent.

According to an exemplary embodiment of the present invention, an asymmetry ratio (AR), which is [a thickness of alkali-free glass]/[a thickness of soda lime glass], may satisfy a range of 0.2 to 0.6. A small AR means that the thickness of the alkali-free glass becomes small, and the thickness of the soda lime glass becomes large. Referring to FIG. 4, stiffness may be secured by adjusting the thickness ratio of the alkali-free glass to the soda lime glass within the above-described range to lower the degree to which the curved laminated glass is bent.

Accordingly, according to an exemplary embodiment of the present invention, a stiffness increasing effect, a weight reducing effect, and a thinning effect of the curved laminated glass may be more improved by adjusting the thickness ratio of the alkali-free glass to the soda lime glass to the above-described range.

According to an exemplary embodiment of the present invention, the alkali-free glass may have a thickness of 0.3 mm to 1.0 mm. Specifically, the alkali-free glass may have a thickness of 0.3 mm to 0.8 mm, 0.4 mm to 0.6 mm, 0.3 mm to 0.7 mm, or 0.5 mm to 0.8 mm. Curved laminated glass including curved alkali-free glass having a thickness within the above-described range has excellent impact resistance, and simultaneously, may become effectively thin and lightweight. Further, plate-like alkali-free glass having a thickness within the above-described range may be easily elastically deformed.

According to an exemplary embodiment of the present invention, the soda lime glass may have a thickness of 2 mm to 3 mm. Specifically, the soda lime glass may have a thickness of 2.5 mm to 3 mm. By adjusting the thickness of the soda lime glass to the above-described range, impact resistance of the curved laminated glass may be prevented from deteriorating. In addition, the curved laminated glass may be effectively lightweight and thinned.

Furthermore, the upper limit values and lower limit values of thicknesses of the alkali-free glass and the soda lime glass may be determined by considering that an external strength and a mechanical impact strength applied to the curved laminated glass is elastically absorbed, and the like.

According to an exemplary embodiment of the present invention, curved laminated glass, which includes the curved alkali-free glass and the curved soda lime glass having a thickness within the above-described range, may have a thickness corresponding to 50% to 80% of the thickness and a weight corresponding to 50% to 80% of the weight of the existing curved laminated glass in which two sheets of curved soda lime glass having a thickness of about 2.1 mm are laminated. Accordingly, according to an exemplary embodiment of the present invention, it is possible to provide curved laminated glass which is lightweight and thinned as compared to the existing curved laminated glass.

According to an exemplary embodiment of the present invention, a fracture toughness ratio of the soda lime glass to the alkali-free glass may be 1:1.10 to 1:1.62. Specifically, the fracture toughness ratio of the soda lime glass to the alkali-free glass may be 1:1.20 to 1:1.55, 1:1.35 to 1:1.45, 1:1.37 to 1:1.43, 1:1.39 to 1:1.41, 1:1.15 to 1:1.30, 1:1.36 to 1:1.39, 1:1.41 to 1:1.45 or 1:1.50 to 1:1.60. The alkali-free glass has a fracture toughness within the above-described range as compared to the soda lime glass and thus may effectively prevent fracture strength of the curved laminated glass from being reduced.

According to an exemplary embodiment of the present invention, the alkali-free glass may have a fracture toughness value of 1.1 MPa·m$^{1/2}$ to 1.3 MPa·m$^{1/2}$. Specifically, the alkali-free glass may have a fracture toughness value of 1.1 MPa·m$^{1/2}$ to 1.25 MPa·m$^{1/2}$, 1.15 MPa·m$^{1/2}$ to 1.25 MPa·m$^{1/2}$, or 1.18 MPa·m$^{1/2}$ to 1.21 MPa·m$^{1/2}$ Curved laminated glass including curved alkali-free glass having a fracture toughness value within the above-described range may have excellent impact resistance. Further, by using alkali-free glass having a fracture toughness value within the above-described range, the alkali-free glass may be prevented from being fractured during the elastically deforming process.

In addition, the soda lime glass may have a fracture toughness value of 0.7 MPa·m$^{1/2}$ to 0.85 MPa·m$^{1/2}$. Specifically, the soda lime glass may have a fracture toughness value of 0.75 MPa·m$^{1/2}$ to 0.83 MPa·m$^{1/2}$, or 0.77 MPa·m$^{1/2}$ to 0.8 MPa·m$^{1/2}$.

The fracture toughness values of the alkali-free glass and the soda lime glass may be measured by using an indentation fracture toughness measurement method, which is a method of calculating the fracture toughness value by pressing down the glass with a Vicker's indenter until cracks occur in the glass, and then using a crack length, an indenter mark, a load, and the like. Specifically, the fracture toughness values of the alkali-free glass and the soda lime glass may be measured by setting an indentation load to 2 Kgf in accordance with the KSL 1600:2010 standard under the conditions of a temperature at 24° C. and a humidity at 35RH %.

According to an exemplary embodiment of the present invention, a Vicker's hardness ratio of the soda lime glass to the alkali-free glass may be 1:1.1 to 1:1.3. Specifically, the Vicker's hardness ratio of the soda lime glass to the alkali-free glass may be 1:1.12 to 1:1.29, 1:1.15 to 1:1.27, or 1:1.2 to 1:1.25. Curved laminated glass including the curved alkali-free glass having a higher hardness than that of the curved soda lime glass may have excellent durability.

According to an exemplary embodiment of the present invention, the alkali-free glass may have a Vicker's hardness of 5.5 GPa to 7 GPa. Specifically, the alkali-free glass may have a Vicker's hardness of 5.8 GPa to 6.9 GPa, 6.0 GPa to 6.7 GPa, 6.2 GPa to 6.5 GPa, or 5.5 GPa to 6.5 GPa. Curved laminated glass including curved alkali-free glass having a Vickers hardness value within the above-described range may have excellent impact resistance, wear resistance, durability, and the like. By using curved alkali-free glass having a Vicker's hardness within the above-described range, impact resistance of the curved laminated glass may be prevented from deteriorating. Further, manufacturing costs of the curved laminated glass may be reduced by reducing the manufacturing price of the curved alkali-free glass. In addition, the soda lime glass may have a Vicker's hardness of 5.0 GPa to 5.5 GPa.

The Vicker's hardnesses of the alkali-free glass and the soda lime glass may be calculated by pressing down glass using a Vicker's indenter, and then measuring a size of a mark. Specifically, the Vicker's hardnesses of the alkali-free glass and the soda lime glass may be measured by setting an indentation load and an indentation maintaining time to 200 gf and 20 seconds, respectively, in accordance with the ASTM C1327-08 standard under the conditions of a temperature at 24° C. and a humidity at 35RH %.

According to an exemplary embodiment of the present invention, a Young's modulus ratio of the soda lime glass to the alkali-free glass may be 1:1.01 to 1:1.2. Specifically, the Young's modulus ratio of the soda lime glass to the alkali-free glass may be 1:1.04 to 1:1.17, 1:1.06 to 1:1.15, 1:1.08 to 1:1.12, or 1:1.08 to 1:1.15. Since the alkali-free glass has a Young's modulus within the above-described range as compared to that of the curved soda lime glass, the curved laminated glass may have a robust structure even when the curved laminated glass includes alkali-free glass which is more lightweight and thinner than the soda lime glass.

According to an exemplary embodiment of the present invention, the alkali-free glass may have a Young's modulus of 70 GPa to 90 GPa. Specifically, the curved thin-plate glass may have a Young's modulus of 73 GPa to 87 GPa, 75 GPa to 85 GPa, 78 GPa to 80 GPa, 75 GPa to 80 GPa, or 80 GPa to 90 GPa. Curved laminated glass including curved alkali-free glass having a Young's modulus within the above-described range may have a robust structure. In addition, the soda lime glass may have a Young's modulus of 65 GPa to 75 GPa.

The Young's moduli of the alkali-free glass and the soda lime glass may be measured by a 3 point bending test. Specifically, the Young's moduli of the alkali-free glass and the soda lime glass may be measured by a 3 point bending test using a tensile strength meter (Zwick/Roell Z010 UTM) under an atmosphere of a temperature at 24° C. and a humidity at 35RH %. More specifically, the Young's modulus may be derived by setting a width and a support span of a sample to 20 mm and 50 mm, respectively, deriving a strain-stress (S-S) curve by converting a displacement and a load measured by the tensile strength meter into a strain value and a stress value, and then using a slope calculated by linear fitting of the S-S curve.

According to an exemplary embodiment of the present invention, it is possible to adopt and use, as the alkali-free glass, glass, which is typically used as window glass of a transportation means, without particular limitation, as long as the glass satisfies the fracture toughness, the Vicker's hardness, and the Young's modulus as described above. As an example, it is possible to use, as the alkali-free glass, glass which is formed from a composition which includes 46 wt % to 57 wt % of $SiO_2$, 21 wt % to 29 wt % of $Al_2O_3$, 3 wt % to 14 wt % of MgO, 11 wt % to 16 wt % of CaO, and 1 wt % to 5 wt % of SrO based on 100 wt % of the composition, and substantially contains no alkali metal oxide.

The composition which substantially contains no alkali metal oxide means a case where an alkali metal oxide is not included in glass at all, or the alkali metal oxide is partially included, but the content thereof is so slight that an amount of alkali metal oxide, which is negligible as a composition component of glass, is included, and the like. As an example, the term "substantially" may mean a case where in a process of manufacturing glass, a trace of alkali metal element inevitably incorporated into glass from refractory materials, which are brought into contact with melt glass, impurities in a glass raw material, and the like is contained.

According to an exemplary embodiment of the present invention, as the alkali-free glass, it is possible to use glass containing less than 1% of alkali metal (Li, Na, K, and the like) oxide as represented by mass percentage based on oxides. Further, as the alkali-free glass, it is possible to use alkali-free borosilicate glass or alkali-free aluminoborosilicate glass. In addition, as the alkali-free glass, it is possible to use glass manufactured by a float method, or glass manufactured by a down draw method or a fusion method.

According to an exemplary embodiment of the present invention, since the alkali-free glass does not include alkali components which weaken the bonding strength of glass, or includes an extremely small amount of the alkali components, the alkali-free glass may have the wear resistance and the impact resistance, which are higher than those of general glass. Accordingly, curved laminated glass including the curved alkali-free glass may have excellent mechanical properties.

According to an exemplary embodiment of the present invention, the alkali-free glass may be non-tempered glass which is not chemically tempered, non-tempered glass which is not tempered by heat, and non-tempered glass which is not tempered by using chemicals and heat.

General tempered glass is glass having an increased strength and imparted with impact resistance, resiliency resistance, and the like, and examples thereof include heat-tempered glass using heat and chemically tempered glass using a chemical ion exchange. When curved laminated glass is manufactured by using the aforementioned tempered glass, the process of processing and molding the tempered glass is not easy, so that there are problems in that the defect rate of the laminated glass to be manufactured is high and costs of manufacturing the curved laminated glass are high.

In contrast, according to an exemplary embodiment of the present invention, the alkali-free glass may be easily elastically deformed because it is possible to use alkali-free glass which is not subjected to chemical tempering and/or heat tempering process(es). Further, it is possible to solve problems which may occur during a process of manufacturing curved laminated glass by using tempered glass in the related art. In addition, by using non-tempered alkali-free glass, it is possible to manufacture curved laminated glass which is strong against a local impact and does not obstruct a visual field of a user and reduces secondary damage caused by shattered glass even when the curved laminated glass is fractured.

According to an exemplary embodiment of the present invention, it is possible to adopt and use, as the soda lime glass, glass, which is typically used as window glass of a transportation means, without particular limitation, as long as the glass satisfies the fracture toughness, the Vicker's hardness, and the Young's modulus as described above. As an example, it is possible to use glass which is formed from a composition including 65 wt % to 75 wt % of $SiO_2$, 0 wt % to 10 wt % of $Al_2O_3$, 10 wt % to 15 wt % of $NaO_2$, 0 wt % to 5 wt % of $K_2O$, 1 wt % to 12 wt % of CaO, and 0 wt % to 8 wt % of MgO based on 100 wt % of the composition. Further, as the soda lime glass, it is also possible to use glass manufactured by a float method using a float bath and glass manufactured by a down draw method or a fusion method.

According to an exemplary embodiment of the present invention, the alkali-free glass and the soda lime glass may each independently further include one or more coloring components. A heat blocking function may be imparted to curved lamination glass to be manufactured by adding a coloring component to the alkali-free glass and the soda lime glass. The coloring component may include $Fe_2O_3$, CoO, Se, and the like, but the type of coloring component is not limited thereto. Further, the content of the coloring component may be 0.0001 part by weight to 2 parts by weight, 0.005 part by weight to 1 part by weight, or 0.01 part by weight to 0.1 part by weight, based on 100 parts by weight of the glass composition. However, the content of the coloring component may be adjusted according to the use in which the curved laminated glass is used. In addition, when the curved laminated glass to be manufactured is applied to a front window or a side or rear window among the windows for an automobile, curved laminated glass having a visible light transmittance of 70% or more may be manufactured by adjusting the content of the coloring component. Furthermore, curved laminated glass having a visible light transmittance of about 5% may be applied to a sunroof window among the windows for an automobile.

According to an exemplary embodiment of the present invention, the functional layer may be a transparent heat generating layer, a transparent display unit, or a color changing layer. The functional layer may be provided on all or a part of the alkali-free glass according to the use of the functional layer to be used. The functional layer may be attached onto one surface of the alkali-free glass by a lamination film or an adhesive agent.

According to an exemplary embodiment of the present invention, it is possible to provide functional curved laminated glass, in which heat may be generated uniformly throughout the glass, by providing a transparent heat generating layer on one surface of the alkali-free glass. When curved laminated glass including the transparent heat generating layer is applied to a window of an automobile, it is possible to prevent a dew condensation phenomenon which may be generated on an automotive window depending on a temperature difference between the inside and the outside of the automobile, and to remove frost.

A configuration publicly known may be used as a transparent heat generating layer, and is not limited as long as an object disposed at the rear portion of the transparent heat generating layer may be seen, and the configuration can generate heat. As an example, the transparent heat generating layer may include a transparent film in which a transparent heat generating electrode with a mesh pattern is formed. As electricity is supplied to the transparent heat generating electrode, the transparent film is heated, and as a result, heat may be provided uniformly throughout the curved laminated glass.

The transparent heat generating electrode may include at least one of gold (Au), silver (Ag), aluminum (Al) copper (Cu), chromium (Cr), nickel (Ni), titanium (Ti), palladium (Pd), molybdenum (Mo), copper oxide ($Cu_2O$, CuO), aluminum oxide ($Al_2O_3$), silver oxide (AgO), chromium oxide ($CrO_x$), titanium oxide ($TiO_2$), palladium oxide (PdO), and molybdenum oxide ($MoO_3$). Further, the transparent heat generating electrode may be a metal mesh electrode composed of a fine conductive line.

In addition, the transparent film may include at least one of polyethylene terephthalate, polycarbonate, polymethylmethacrylate, polyethylene naphthalate, polyethylene sulfone, a cyclic olefin polymer, triacetylcellulose (TAC), polyvinyl alcohol, polyimide, and polystyrene.

According to an exemplary embodiment of the present invention, display glass in the form of a curved surface may be manufactured by providing a transparent display on one surface of the alkali-free glass. As the transparent display unit, a publicly-known configuration may be used, and the configuration is not limited as long as an object disposed at the rear portion of the transparent display unit may be seen, and information may be outputted.

The transparent display unit may include a transparent display panel and a control module which controls the transparent display panel. The transparent display panel may include one of a liquid crystal display (LCD), a thin film transistor-liquid crystal display (TFT LCD), an organic light emitting diode (OLED), a flexible display, and a 3D display, and may be configured as a transparent-type or light transmission-type display, so that the rear portion thereof may be seen through the transparent display panel.

Further, when a transparent display panel and a touch sensor form a structure in which the transparent display panel and the touch sensor are layered or are formed as an integrated type, the transparent display panel may also be used as an input device in addition to an output device. Since the alkali-free glass does not include an alkali component, or includes an extremely small amount of the alkali component, the alkali-free glass may be used as substrate glass. That is, a touch film, a touch sheet, a touch pad, and the like may be formed on the alkali-free glass. Therefore, according to an exemplary embodiment of the present invention, it is possible to provide functional curved laminated glass to which a display function, a touch function, and the like are added.

When curved laminated glass including the transparent display unit is applied to automotive glass, it is possible to provide automotive glass which may output driving-related information and the like required for a user. Further, it is possible to laminate one surface of the alkali-free glass, which is provided with a functional layer including the transparent display panel and the touch sensor, to one concave surface of curved soda lime glass. By disposing curved alkali-free glass provided with the functional layer inside an automobile, it is possible to provide a clearer display screen to the user, and to improve touch sensitivity.

According to an exemplary embodiment of the present invention, by providing a color changing layer on one surface of the alkali-free glass, it is possible to provide functional curved laminated glass in which the color or light transmittance of the glass may be changed as voltage is applied. The curved laminated glass including the color changing layer may be applied to a sunroof window, a side window, and the like among the windows for an automobile.

As the color changing layer, a publicly-known configuration may be used, and the configuration is not limited as long as the color or light transmittance may be changed by electric stimulus. As an example, a color changing layer may include a conductive layer to which a power source is connected, an electrolyte layer disposed between the conductive layers, and an ion power storage layer disposed at one side of the electrolyte layer. When electric current is supplied to the conductive layer, the color changing layer may be color-changed by electrons emitted from the ion power storage layer connected to the conductive layer.

Another exemplary embodiment of the present invention provides curved laminated glass manufactured by the method of manufacturing curved laminated glass.

An exemplary embodiment of the present invention provides curved laminated glass including: alkali-free glass provided with a functional layer on one surface thereof; and soda lime glass laminated to the one surface of the alkali-free glass provided with a functional layer by a lamination film or a bonding agent, in which the alkali-free glass and the soda lime glass are bent while forming a curved surface in a state of being fit with each other.

The curved laminated glass according to an exemplary embodiment of the present invention may have excellent durability. Further, it is possible to provide curved laminated glass which is lightweight and thin.

Alkali-free glass, a functional layer, soda lime glass, a lamination film, and a bonding agent, which are included in the curved laminated glass according to an exemplary embodiment of the present invention, are the same as the alkali-free glass, the functional layer, the soda lime glass, the lamination film, and the bonding agent in the above-described method of manufacturing curved laminated glass.

According to an exemplary embodiment of the present invention, a thickness ratio of the soda lime glass to the alkali-free glass may be 1:0.2 to 1:0.6. It is possible to provide curved laminated glass, which has excellent durability and is lightweight and thin, by adjusting the thickness ratio of the soda lime glass to the alkali-free glass to the above-described range. Further, it is possible to increase stiffness of the curved laminated glass.

According to an exemplary embodiment of the present invention, the alkali-free glass may have a thickness of 0.3 mm to 1.0 mm. In addition, the soda lime glass may have a thickness of 2 mm to 3 mm. Curved laminated glass including curved alkali-free glass and curved soda lime glass having thicknesses within the above-described range may have excellent impact resistance. Furthermore, the curved laminated glass may be effectively lightweight and thinned.

According to an exemplary embodiment of the present invention, a fracture toughness ratio of the soda lime glass to the alkali-free glass may be 1:1.10 to 1:1.62.

According to an exemplary embodiment of the present invention, the functional layer may be a transparent heat generating layer, a transparent display unit, or a color changing layer. The functional layer may be provided on all or a part of the alkali-free glass according to the use of the functional layer to be used.

By providing the transparent heat generating layer, the transparent display unit, or the color changing layer on alkali-free glass, it is possible to provide functional curved laminated glass in which heat may be generated uniformly throughout the glass, functional curved laminated glass which may output driving-related information, and the like required for a user, or functional curved laminated glass in which light transmittance may be adjusted.

According to an exemplary embodiment of the present invention, the curved laminated glass may be a window for an automobile. As an example, the curved laminated glass may be applied to a front window, a side window, a rear window, and/or a sunroof window among the windows for the automobile. Further, when the curved laminated glass is used as an automotive front window, the curved laminated glass has a streamlined curved shape and thus may effectively reduce resistance against flowing wind during the driving of an automobile.

Hereinafter, the present disclosure will be described in more detail through Examples. These Examples are provided for only explaining the present disclosure, and are not intended to limit the present disclosure.

Example 1

Alkali-free glass including 61 wt % of $SiO_2$, 16 wt % of $Al_2O_3$, 3 wt % of MgO, 8 wt % or less of CaO, and 0.05 wt % of SrO based on 100 wt % of the glass and having a thickness of 0.5 mm was prepared. Soda lime glass including 72 wt % of $SiO_2$, 0.15 wt % of $Al_2O_3$, 14 wt % of $Na_2O$, 0.03 wt % of $K_2O$, 9 wt % of CaO, and 4 wt % of MgO based on 100 wt % of the glass and having a thickness of 2.1 mm was prepared. Further, a polyvinyl butyral film having a thickness of 0.76 mm was prepared as a lamination film. The prepared alkali-free glass had a Young's modulus of 78 GPa, a Vicker's hardness of 6.0 GPa, and a fracture toughness of 1.20 $MPa \cdot m^{1/2}$, and the prepared soda lime glass had a Young's modulus of 72 GPa, a Vicker's hardness of 5.3 GPa, and a fracture toughness of 0.85 $MPa \cdot m^{1/2}$.

First, the soda lime glass was heated at 600° C. for 60 seconds, and processed into a curved surface by using a self-weight. Thereafter, a conductive metal capable of generating heat was coated to a thickness of about 10 nm onto one surface of the alkali-free glass by using a chemical vapor deposition method. Specifically, a seed layer was provided on one surface of the alkali-free glass and silver, which is a conductive metal, was coated to a thickness of about 10 nm on the seed layer by using a chemical vapor deposition method. Thereafter, a functional layer capable of generating heat was formed by providing a protective layer on the conductive metal layer. In this case, the seed layer and the protective layer were formed of silicon dioxide.

Thereafter, a lamination film was attached onto the conductive metal coated on the alkali-free glass, and was disposed so as to be adjacent to a concave surface of the soda lime glass processed into a curved surface. Thereafter, the soda lime glass, the alkali-free glass, and the lamination film were put into a vacuum bag and sealed, and then the soda lime glass and the alkali-free glass were laminated to each other by compressing the soda lime glass, the alkali-free glass, and the lamination film with a vacuum ring under conditions of a temperature of about 20° C. and a pressure of 150 torr. Curved laminated glass having a heat generating function was manufactured by treating the laminated alkali-free glass and soda lime glass in an autoclave under conditions of a temperature of about 130° C. and a pressure of 9,750 torr.

Example 2

Alkali-free glass, soda lime glass, and a lamination film, which were the same as those in Example 1, were prepared.

First, the soda lime glass was processed into a curved surface by using a self-weight while being heated at 600° C. for 60 seconds. Thereafter, a thin-film transistor array (TFT array) patterning process was carried out on one surface of the alkali-free glass. Specifically, the patterning process is a process of forming a gate electrode, an insulation film, a semiconductor film, a data electrode, a protective film, and a pixel electrode on a glass plate, and all of the pattern deposition, washing, PR application, exposure, development, etching, PR peeling, and inspection processes were separately carried out in the respective steps.

Thereafter, a lamination film was attached onto the TFT array pattern formed on the alkali-free glass, and was disposed so as to be adjacent to a concave surface of the soda lime glass processed into a curved surface. Thereafter, the soda lime glass, the alkali-free glass, and the lamination film were put into a vacuum bag and sealed, and then the soda lime glass and the alkali-free glass were laminated to each other by compressing the soda lime glass, the alkali-free glass, and the lamination film with a vacuum ring under conditions of a temperature of about 20° C. and a pressure of 150 torr. Curved laminated glass having a display function was manufactured by treating the laminated alkali-free glass and soda lime glass in an autoclave under conditions of a temperature of about 130° C. and a pressure of 9,750 torr.

Comparative Example 1

Two sheets of soda lime glass including 72 wt % of $SiO_2$, 0.15 wt % of $Al_2O_3$, 14 wt % of $Na_2O$, 0.03 wt % of $K_2O$, 9 wt % of CaO, and 4 wt % of MgO based on 100 wt % of the glass and having a thickness of 2.1 mm were prepared. The prepared soda lime glass had a Young's modulus of 72 GPa, a Vicker's hardness of 5.3 GPa, and a fracture toughness of 0.85 $MPa \cdot m^{1/2}$. Further, two polyvinyl butyral lamination films having a thickness of 0.34 mm and a conductive metal mesh capable of generating heat were prepared. A lamination film to which a heat-generating function was added was manufactured by providing the conductive metal mesh between the two lamination films.

Thereafter, the two sheets of soda lime glass were overlapped with each other, and then processed into a curved surface by using a self-weight while being heated at about 600° C. for 60 seconds. Thereafter, the lamination film to which a heat-generating function was added was inserted between the two sheets of soda lime glass processed into a curved surface, and curved laminated glass having a heat generating function was manufactured by treating the two sheets of soda lime glass under conditions of a temperature of about 130° C. and a pressure of 9,750 torr in an autoclave.

Comparative Example 2

Two sheets of soda lime glass, which were the same as those in Comparative Example 1, were prepared, and a polyvinyl butyral film having a thickness of 0.76 mm was prepared as a lamination film.

Thereafter, the two sheets of soda lime glass were overlapped with each other, and then processed into a curved surface by using a self-weight while being heated at about 600° C. for 60 seconds. Thereafter, a thin-film transistor array (TFT array) pattern was formed on the other convex surface of the soda lime glass by carrying out a TFT array patterning process, which was the same as that in Example 2.

Thereafter, a lamination film was attached onto the TFT array pattern, and the two sheets of soda lime glass were laminated thereto. Thereafter, curved laminated glass having a display function was manufactured by treating the laminated two sheets of soda lime glass in an autoclave under conditions of a temperature of about 130° C. and a pressure of 9,750 torr.

Manufacturing Result

In the case of Comparative Example 1, a conductive metal mesh was inserted between the two lamination films because the coating thickness of the conductive metal could not be precisely controlled on the soda lime glass molded into a curved surface. However, since the spacing of the mesh was constantly maintained and disconnection prevention work was required in order to insert the conductive metal mesh between the two lamination films, the degree of difficulty of the process was very high. As a result of manufacturing curved laminated glass having a heat generating function in Example 1 and Comparative Example 1, manufacturing costs for the curved laminated glass having a heat generating function in Comparative Example 1 were high by about 120% or more as compared to the manufacturing costs for that in Example 1.

As a result of manufacturing (curved laminated glass having a display function in Example 2 and Comparative Example 2, it was confirmed that the display of the curved laminated glass manufactured in Example 1 was operated. In contrast, in the case of Comparative Example 2, it was confirmed that the thin film was separated due to the elution of alkali components of the soda lime glass brought into contact with the TFT array pattern surface, the electric conductivity was reduced, and as a result, the display was not operated.

Falling Ball Impact Test 50 samples of each of the curved laminated glass manufactured in Example 1, Example 2, Comparative Example 1, and Comparative Example 2 were prepared. A falling ball impact test was performed by a method of applying impact to the sample by disposing the prepared samples, such that the soda lime glass was positioned at the upper side based on the ground, and dropping a ball having a weight of 227 g from a height of 2.8 m from the sample.

FIG. 5 is a view illustrating a falling ball impact test result of curved laminated glass manufactured in Example 1, Example 2, Comparative Example 1, and Comparative Example 2. FIG. 5 illustrates falling ball impact fracture rates for the 50 samples of each of the curved laminated glass manufactured in Example 1, Example 2, Comparative Example 1, and Comparative Example 2. The falling ball impact fracture rate means a ratio of the sample where the occurrence of fracture was confirmed with the unaided eye in the 50 samples where the falling ball impact test was performed.

Referring to FIG. 5, it could be confirmed that the curved laminated glass manufactured in Example 1 and Example 2 had a smaller falling ball impact fracture rate than those of the curved laminated glass including two sheets of curved soda lime glass according to Comparative Example 1 and Comparative Example 2.

High-Speed Moving Object Impact Test 50 samples of each of the curved laminated glass manufactured in Example 2 and Comparative Example 2 were prepared. A high-speed moving object impact test was performed by a method of erecting the prepared samples vertically with respect to the ground and discharging a 1-g ball at a speed of 130 km/h and a speed of 150 km/h toward the side of the soda lime glass of the sample.

FIG. 6 is a view illustrating a high-speed moving object impact test result of curved laminated glass manufactured in Example 2 and Comparative Example 2. FIG. 6 illustrates high-speed moving object impact fracture rates for the 50 samples of each of the curved laminated glass manufactured in Example 2 and Comparative Example 2. The high-speed moving object impact fracture rate means a ratio of the sample where the occurrence of fracture was confirmed with the unaided eye in the 50 samples where the high-speed moving object impact test was performed.

Referring to FIG. 6, it could be confirmed that for the ball discharged at a speed of 130 km/h and a speed of 150 km/h, the curved laminated glass manufactured in Example 2 had a smaller fracture rate than that of the curved laminated glass in Comparative Example 2.

EXPLANATION OF REFERENCE NUMERALS AND SYMBOLS

100: Alkali-free glass
110: Functional layer
200: Soda lime glass
300: Lamination film
1000: Curved laminated glass

The invention claimed is:

1. A method of manufacturing a curved laminated glass, the method comprising:
    preparing a curved soda lime glass;
    providing a functional layer directly on one surface of an alkali-free glass which is a flat plate;
    disposing a lamination film or a bonding agent between the curved soda lime glass and the functional layer; and
    elastically deforming the alkali-free glass having the functional layer thereon, and laminating the alkali-free glass having the functional layer thereon with the curved soda lime glass such that the alkali-free glass and the curved soda lime glass fit with each other and form the curved laminated glass,
    wherein a fracture toughness ratio of the soda lime glass to the alkali-free glass is 1:1.41 to 1:1.62,
    wherein a thickness ratio of the soda lime glass to the alkali-free glass is 1:0.2 to 1:0.6, and
    wherein the functional layer is a transparent heat generating layer.

2. The method of claim 1, wherein the alkali-free glass is elastically deformed at a temperature of 50° C. or less.

3. The method of claim 1, further comprising:
    heat treating the curved laminated glass at a temperature of 80° C. to 140° C.

4. The method of claim 1, wherein the curvature of the elastically deformed alkali-free glass conforms to the curvature of the curved soda lime glass.

5. The method of claim 1, wherein the alkali-free glass has a thickness of 0.3 mm to 1.0 mm.

6. A curved laminated glass comprising:
    an alkali-free glass provided with a functional layer directly on one surface thereof; and
    a soda lime glass laminated to the one surface of the alkali-free glass provided with the functional layer by a lamination film or a bonding agent,
    wherein the alkali-free glass and the soda lime glass are bent while forming a curved surface in a state of being fit with each other, and
    wherein a fracture toughness ratio of the soda lime glass to the alkali-free glass is 1:1.41 to 1:1.62,
    wherein a thickness ratio of the soda lime glass to the alkali-free glass is 1:0.2 to 1:0.6, and
    wherein the functional layer is a transparent heat generating layer.

7. The curved laminated glass of claim 6, wherein the alkali-free glass has a thickness of 0.3 mm to 1.0 mm.

8. The curved laminated glass of claim 6, wherein the curved laminated glass is a window for an automobile.

* * * * *